(12) United States Patent
McBeath

(10) Patent No.: US 10,917,372 B2
(45) Date of Patent: Feb. 9, 2021

(54) METHOD AND SYSTEM FOR INTEGRATION OF SHARED PHOTO ALBUMS WITH MESSAGING APPLICATIONS

(71) Applicant: BlackBerry Limited, Waterloo (CA)

(72) Inventor: Sean Michael McBeath, Keller, TX (US)

(73) Assignee: BlackBerry Limited, Waterloo (CA)

( * ) Notice: Subject to any disclaimer, the term of this patent is extended or adjusted under 35 U.S.C. 154(b) by 95 days.

(21) Appl. No.: 16/138,575

(22) Filed: Sep. 21, 2018

(65) Prior Publication Data

US 2020/0099639 A1     Mar. 26, 2020

(51) Int. Cl.
*G06F 15/16* (2006.01)
*H04L 12/58* (2006.01)
*G06F 16/51* (2019.01)
*G06F 16/176* (2019.01)

(52) U.S. Cl.
CPC ............ *H04L 51/10* (2013.01); *G06F 16/176* (2019.01); *G06F 16/51* (2019.01); *H04L 51/12* (2013.01); *H04L 51/16* (2013.01)

(58) Field of Classification Search
CPC ......... H04L 51/10; H04L 51/12; H04L 51/16; G06F 16/51; G06F 16/176
USPC ........................................................ 709/206
See application file for complete search history.

(56) References Cited

U.S. PATENT DOCUMENTS

| | | | |
|---|---|---|---|
| 8,385,950 B1* | 2/2013 | Wagner | H04L 67/325 455/466 |
| 2005/0102381 A1 | 5/2005 | Jiang et al. | |
| 2008/0288499 A1 | 11/2008 | Choi et al. | |
| 2012/0027256 A1 | 2/2012 | Kiyohara et al. | |
| 2012/0131102 A1* | 5/2012 | Gabos | H04N 1/00164 709/204 |
| 2014/0280561 A1* | 9/2014 | DuBois | H04L 67/02 709/204 |
| 2015/0039616 A1 | 2/2015 | Rolston et al. | |
| 2015/0143236 A1 | 5/2015 | Tena Rodriguez et al. | |

(Continued)

FOREIGN PATENT DOCUMENTS

| | | |
|---|---|---|
| WO | 2014040157 A1 | 3/2014 |
| WO | 2016100318 A2 | 6/2016 |

OTHER PUBLICATIONS

Apple Inc.; "iCloud: Create a Shared Album"; https://web.archive.org/web/20150310010447/https://support.apple.com/kb/PH12068?locale=en_US; Feb. 5, 2015; 3 pages.

(Continued)

*Primary Examiner* — Atta Khan
(74) *Attorney, Agent, or Firm* — Conley Rose, P. C.; J. Robert Brown, Jr.

(57) ABSTRACT

A method at an electronic device, the method including receiving a user interface input within a messaging application on the electronic device, the user interface input signaling that at least one of photographs or videos exchanged within a message thread on the messaging application should be stored within a shared photo album; comparing correspondents of the message thread with membership in at least one shared photo album accessible by the electronic device; selecting at least one shared photo album based on the comparing; and configuring one of the selected at least one shared photo album as a configured shared photo album.

20 Claims, 9 Drawing Sheets

(56) References Cited

U.S. PATENT DOCUMENTS

2015/0288632 A1* 10/2015 Zheng .................... H04L 51/32
　　　　　　　　　　　　　　　　　　　　　　　　　709/206
2016/0352667 A1    12/2016 Pickett et al.
2017/0093780 A1     3/2017 Lieb et al.

OTHER PUBLICATIONS

Apple Inc.; "Send Photo, Video, or Audio Messages on Your iPhone, iPad, or iPod Touch"; https://suppor.apple.com/en-us/HT203038; Sep. 19, 2018; 4 pages.
Loxton, David, et al.; "Automatic Creation of Photo Albums from Group Conversations"; Technical Disclosure Commons; Nov. 15, 2017; 6 pages.
European Extended Search Report; Application No. 19194422.2; dated Feb. 20, 2020; 8 pages.

* cited by examiner

METHOD AND SYSTEM FOR INTEGRATION OF SHARED PHOTO ALBUMS WITH MESSAGING APPLICATIONS

FIELD OF THE DISCLOSURE

The present disclosure relates to shared photo albums and messaging applications, and in particular relates to the integration of shared photo albums and messaging applications.

BACKGROUND

Modern electronic devices support shared photo albums, where a shared photo album is one in which two or more people or electronic devices have access to the pictures or videos to view, add, edit and/or delete entries. Such shared photo album may be a cloud or server based album which may be accessed and sometimes synchronized with a local copy of the shared photo album on the electronic device. The shared photo album is typically separate from a default photo album for a user, which may not be shared. In other words, non-shared pictures can be placed in a first album, while shared pictures can be placed in an album shared by the two or more users.

The use of a shared photo album is an easy way to share only the photos or videos that a user wants with the people the user chooses. These people can then view, like, and comment on the photos and videos in the shared album and they can download the photos. People with access to the shared album may also in some cases be able to add their own photos and videos to the albums. In some cases, the shared photo album may become a public website by selecting an option in the album's settings.

Further, modern electronic devices may have messaging applications to allow two or more people to communicate with each other. Modern messaging applications offer a convenient way of sending photos between users. In many cases, users prefer using a messaging platform for exchanging photos.

However, in the electronic devices, the messaging applications and shared photo albums are not well integrated. This can lead to a poor user experience.

BRIEF DESCRIPTION OF THE DRAWINGS

The present disclosure will be better understood with reference to the drawings, in which.

DETAILED DESCRIPTION OF THE DRAWINGS

Figure 2:
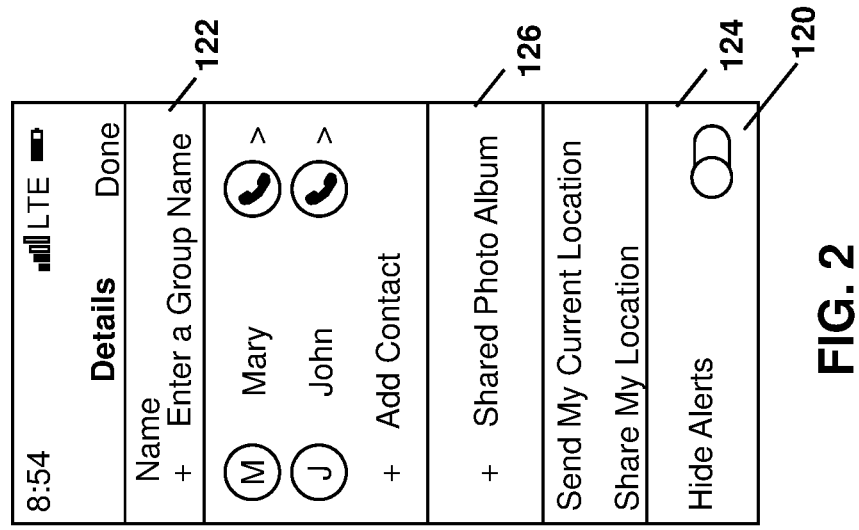
FIG. 2 is a block diagram showing an example window showing attributes of a messaging thread, and used for a configuring a shared photo album within the messaging application.

The present disclosure provides a method at an electronic device, the method comprising: receiving a user interface input within a messaging application on the electronic device, the user interface input signaling that at least one of photographs or videos exchanged within a message thread on the messaging application should be stored within a shared photo album; comparing correspondents of the message thread with membership in at least one shared photo album accessible by the electronic device; selecting at least one shared photo album based on the comparing; and configuring one of the selected at least one shared photo album as a configured shared photo album.

The present disclosure further provides a method at an electronic device, the method comprising: receiving, in a new message thread in a messaging application, a name for a shared photo album as a recipient for the new message thread, the shared photo album having at least two members; receiving input of a first message for transmission within the message thread; transmitting the first message to at least one other member of the shared photo album; receiving input of a first image for transmission within the message thread; and enabling automatic saving of the image to the named shared photo album upon transmission.

The present disclosure further provides an electronic device comprising: a processor; and a communications subsystem, wherein the electronic device is configured to: receive a user interface input within a messaging application on the electronic device, the user interface input signaling that at least one of photographs or videos exchanged within a message thread on the messaging application should be stored within a shared photo album; compare correspondents of the message thread with membership in at least one shared photo album accessible by the electronic device; select at least one shared photo album based on the comparing; and configure one of the selected at least one shared photo album as a configured shared photo album.

The present disclosure further provides a computer readable medium for storing instruction code which, when executed by a processor of an electronic device cause the electronic device to: receive a user interface input within a messaging application on the electronic device, the user interface input signaling that at least one of photographs or videos exchanged within a message thread on the messaging application should be stored within a shared photo album; compare correspondents of the message thread with membership in at least one shared photo album accessible by the electronic device; select at least one shared photo album based on the comparing; and configure one of the selected at least one shared photo album as a configured shared photo album.

Modern electronic devices support shared photo albums. Electronic devices, as used herein, can be any wired or wireless device, including, but not limited to, mobile devices such as user equipments, smart phones, data enabled mobile devices, paging devices, data enabled cellular telephones, laptops, Internet of things devices, or other computing device, or may be any fixed devices including computing devices, servers, Internet of things devices, among other options.

An electronic device may have multiple applications that are used for user convenience. These include photo applications for storing and access pictures or videos, either locally on the electronic device, or through a communications subsystem communicating with a server or service. Other applications include messaging applications for the user to communicate with others.

Modern messaging applications are a convenient way for users to share pictures. However, in order to place these pictures into a photo album that is shared by the users, a cumbersome process is typically involved. For example, in some cases, if a user wants to save a photo to a shared photo album that was previously sent in a message, the user must click on the photo and then save it. The user must then navigate to the photos application and click on the photo again, navigate some menu options to add the photo to the shared photo album. Similarly, user engagement and direction from within the shared photo album application is not preferred by most users.

Thus, there is a need for more elegant integration of messaging applications and shared photo album applications.

In the embodiments below, various solutions for integrating messaging and shared photo album applications are provided. These embodiments include the integration of the messaging application into the selection of a particular shared photo album into which to add a photo or video. The messaging application may then recognize photos or videos within the message stream and automatically place these photos or videos into the shared photo album. Further, in some embodiments, messaging can be facilitated through the shared photo album. In other cases, the solutions can be combined together.

Automatic Storage Within a Shared Photo Album of Content from a Messaging Application In accordance with one embodiment of the present disclosure, from within a messaging thread, an option is provided to automatically store photos transmitted and received within the messaging thread to an existing shared photo album.

Figure 1:
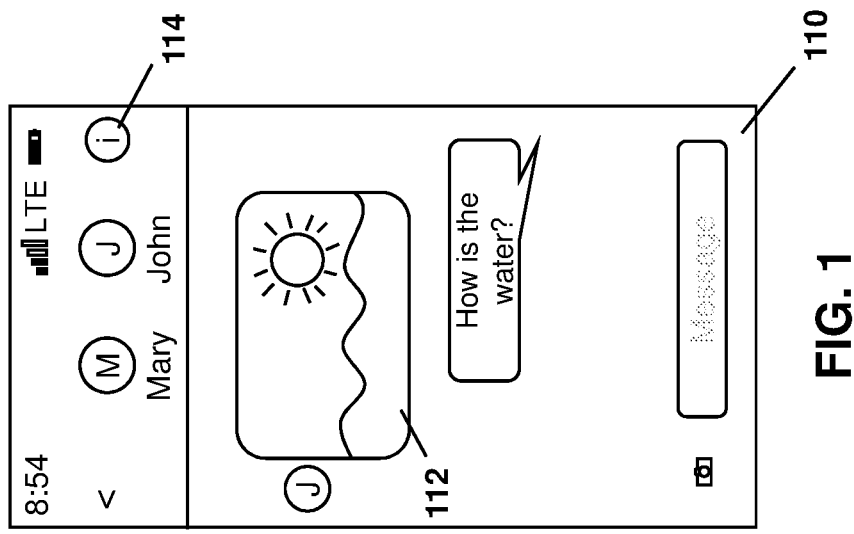
FIG. 1 is a block diagram showing an example window used for a messaging application.

Reference is now made to FIG. 1. FIG. 1 shows an example user interface for a messaging application on an electronic device. In the example of FIG. 1, a user interface 110 provides for a group chat between Mary, John and the user of the electronic device. In this case, John has sent a picture 112 to the group.

However, as indicated above, in order to save the picture 112 into a shared photo album, a user would typically need to click on the user interface and store the photograph into a photo album. The user would then have to access the photo album and share the photograph into a shared album.

In accordance with one embodiment of the present disclosure, a user interface element such as an information tab 114, may be selected to allow a user to associate photographs or videos within a messaging stream with a shared photo album. In particular, if a user selects the information tab 114, a user interface 120 as shown in FIG. 2 may be presented to a user. However, user interface 120 as merely an example user interface, and other user interfaces may be presented to a user.

User interface 120 of FIG. 2 may provide information with regard to the group chat of FIG. 1. On clicking the information tab 114, options such as "Enter a Group Name", shown in area 122, or hide alerts, shown in area 124, may be presented to user.

In accordance with one embodiment the present disclosure, an option to add pictures and videos to a designated shared photo album, shown in area 126, may be provided to a user. Once the option in area 126 is selected and configured, all photos or videos transmitted or received within the messaging thread will automatically be saved to the designated shared photo album.

Further, by selecting the option in area 126, in some cases a prompt may be provided to a user for the length of the automatic saving or an end date to stop the saving. The length of time can correspond to a specified length of time, e.g., 1 hour, 2 hours, 1 day, etc., or can correspond to a specific beginning and/or ending date. The length of time can also correspond to a time when the location of the mobile device is determined to be in a given location (e.g. via GPS, cellular location determination, or other known location determination technologies). For example, if the mobile device is normally located in Texas, and the location of the mobile device is determined to be in Canada, then the length of time can correspond to the time when the mobile device is determined to be in Canada. The prompt can include options corresponding to specific times or specific locations.

Thus, in a situation where two users are on a vacation together and wish to share photographs into a shared vacation photo album, the selection of the option in area 126 will allow any photographs that are provided between the two users through the messaging application for the duration of the vacation to be saved into such shared photo album.

Data about each photo saved may include supplementary information such as likes, laughs, comments, among other options. Such data may also automatically be saved to the shared photo album.

Figure 3:
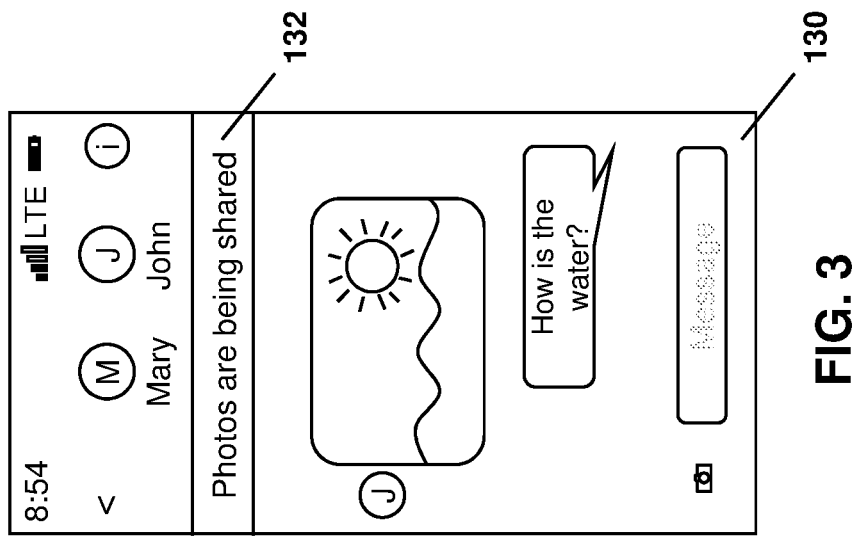
FIG. 3 is a block diagram showing an example window used for a messaging application in which an alert that photographs or videos are automatically being saved to a shared photo album is provided.

Upon choosing to save photos into the shared photo album, a user interface for the messaging application may in some cases be modified. For example, reference is now made to FIG. 3. FIG. 3 shows the user interface for the messaging application, similar to FIG. 1. However, in this case, the user interface includes a notification 132 that photos are being shared and may further include details about which photo album the photos are being shared to. This allows a user to be aware that the photos and videos are being shared, and interaction with the alert in area 132 may allow the user to disable the automatic sharing in some cases. If a specific length of time, area 132 may further include an indication of the length of time.

Figure 4:
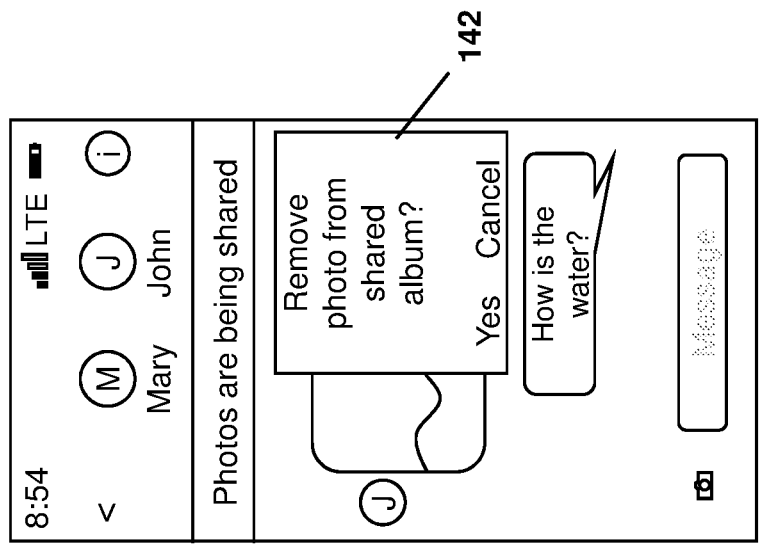
FIG. 4 is a block diagram showing an example window used for a messaging application in which a photograph may be selected to remove the photograph from a shared photo album.

Further, in some embodiments, additional menu options may be provided. For example, if the photograph is clicked after automatically saving to a shared photo album is configured, a menu 142 as shown in FIG. 4 may be presented to user. This menu may, for example, in some embodiments provide an option to remove the photograph from the shared album. In this way, a user may manage photographs by deleting photos from the shared photo album rather than having to choose and save the photos to the photo album.

Figure 5:
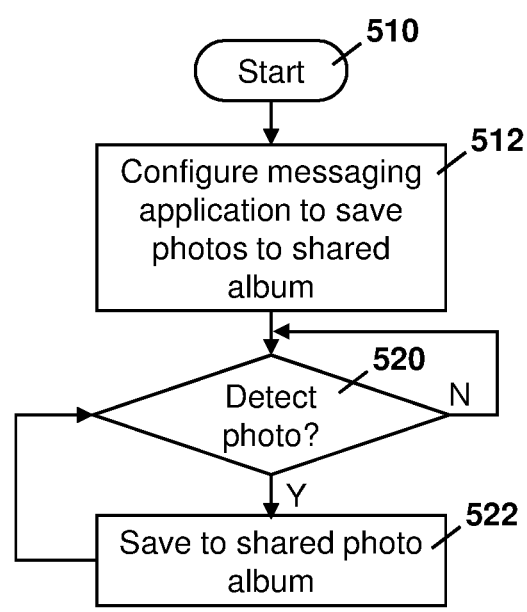
FIG. 5 is a process diagram showing a process at an electronic device for monitoring a message thread, detecting photos and saving the photos to a shared photo album.

Thus, based on the above, FIG. 5 shows an example process at an electronic device for saving photographs or videos within a messaging stream to a shared photo album. The process of FIG. 5 starts at block 510 and proceeds to block 512 in which the electronic device configures the messaging application to save photos to one or more shared photo albums. The configuration may be based on the selection in area 126 as provided above with regard to FIG. 2. As described below, the particular shared photo album into which to save the pictures or videos may be created or chosen based on a variety of criteria. Further, the configuration at block 512 may have time limits, photographs size limits, among other configurable options. For example, the configuration may limit the origin of photos to be only the camera of the mobile device (not downloaded from internet).

From block 512, the process proceeds to block 520 in which a check is made to determine whether a photo is detected within the messaging application. In some cases, the detection is based only on messages sent or received from the electronic device, and not on draft messages within the messaging application. If not, the process continues to wait until photo is detected.

Once the photo is detected, the process proceeds from block 520 to block 522 in which the photograph or video is saved to the shared photo album.

From block 522, the process proceeds back to block 520 to continue to determine whether more photographs are detected within the messaging stream.

Photo Album Selection

In one embodiment, the shared photo application and messaging application are distinct applications (or subsets of distinct applications), but data and other features may be integrated to allow for the choice of shared photo album to be made automatically or for a user to be prompted with a shared photo album determined based on messaging correspondents. For example, reference is now made to FIG. 6, which shows a user interface of an electronic device. The user interface of FIG. 6 is however merely provided to illustrate the embodiments herein and is not limiting.

Figure 6:
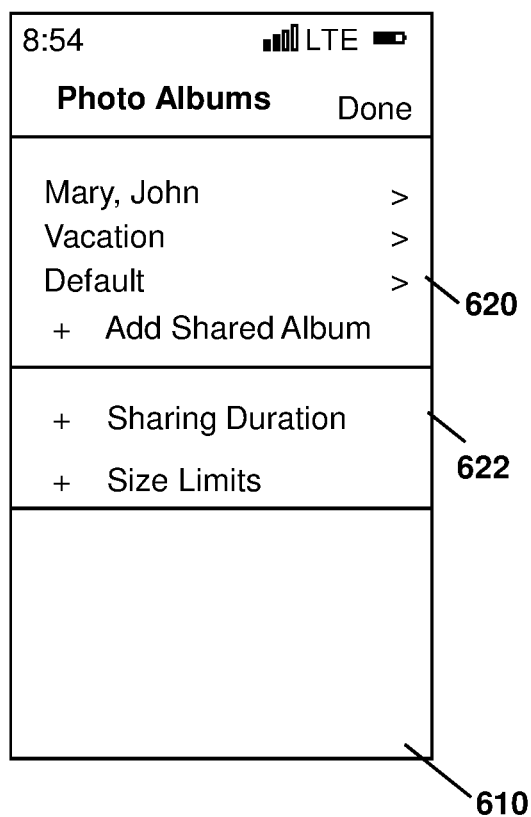
FIG. 6 is a block diagram showing an example window with an ordered selection of possible shared photo albums into which photos or videos in the message thread can be saved.

In the embodiment of FIG. 6, window 610 may be used to configure a shared photo album accessible by the electronic device, for example when area 126 from FIG. 2 is selected.

Area 620 shows various photo albums. In accordance with one embodiment of the present disclosure, shared photo album selection may be made based on the participants in a message thread. In particular, if a device is requested to share photographs in a messaging thread, it may compare the messaging correspondents with members of the various shared photo albums. If there is a single match, the photo album in area 620 may initially be set to the photo album whose membership matches the messaging correspondents.

If multiple matches for photo albums exist, then the device may prompt the user to select one of the matching albums, may select one of the matching albums by default, or may sort a list of shared photo albums (e.g. in a drop down list or in area 620) based with matching albums being shown before non-matching albums.

Other configuration parameters such as sharing duration or photo and video size limits may also be provided to a user, as shown in area 622.

The selection or presentation of shared photo albums to a user may be done based on membership in shared photo albums and the participants identified in messaging. For example, reference is now made to FIG. 7.

Figure 7:
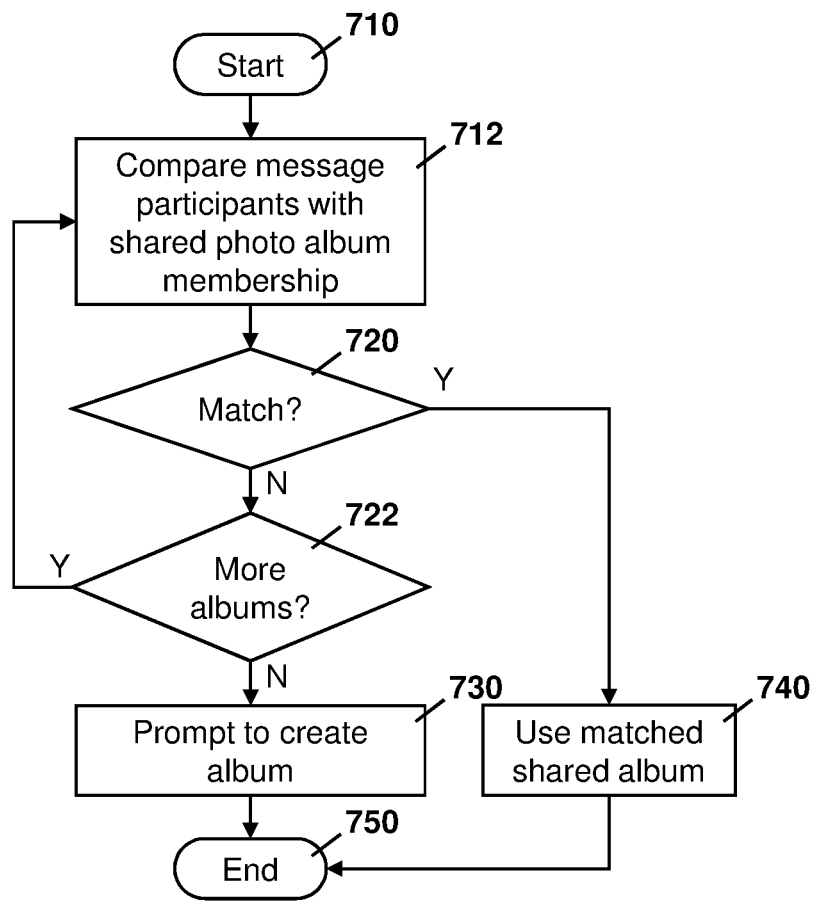
FIG. 7 is a process diagram showing a process at an electronic device for selecting candidate photo albums for saving photos or videos from a message thread.

The process of FIG. 7 starts at block 710 when an option to save photos to a shared album is selected within a messaging application. The process then proceeds to block 712 in which the electronic device may compare message participants with shared photo album membership.

The process then proceeds to block 720 in which a check is made to determine whether a match was found between the shared photo album membership and the message participants.

If not, the process proceeds to block 722 in which a check is made to determine whether more shared photo albums can be compared. If yes, the process may proceed back to block 712 in which a new photo album is selected and a new comparison is made.

At block 722, if there are no further photo albums to compare, and a match has not been found, then the process may proceed to block 730 in which a user may be prompted to create a new shared album.

Conversely, if a match is found at block 720, then the process proceeds to block 740 in which the matched shared photo album may be presented to a user as a photo album choice, for example as photo album field 620 in FIG. 6. In other cases, the matching album may automatically be selected at block 740.

Alternatively, even if a match is found at block 720, the process may still proceed to block 722 and continued to loop until all the photo albums have been processed. In this case, a list of matching shared photo albums may be compiled which may be presented to a user (e.g. via selection of a drop-down list or menu in area 620). If a list is presented to the user, the list of matching photo albums may be presented first, followed by non-matching photo albums. This would provide the ability to use a different photo album than the first found album.

From blocks 730 and 740 the process may proceed to block 750 and end.

The check for the match at block 720 may be done in various ways. In one embodiment, only an exact match will be valid at block 720. Thus, if membership in a shared photo album only has the people participating in the messaging, only then will there be a match found at block 720. For example, if the messaging is between Mike and Mary and the shared photo album has Mike and Mary as the shared members, then a match is found at block 720.

However, in some cases, the shared photo album membership may include Mike and Mary, but may include other members as well. For example, a neighborhood shared photo album may include Mike and Mary but may include several other users as well. In this case, if no better photo album is found then the selection may be made for the shared photo album with the membership that includes Mike and Mary but includes other participants as well. In this case, the shared photo album with the additional membership may be selected by default. In other cases, the user may be prompted to select the shared photo album and acknowledge that the other members of the album will also see the pictures. In other cases, the matching or partial matching can may be disabled based on user settings and thus only if an exact match is found at block 720 will the matched photo album be used at block 740.

Similarly, if the messaging correspondents include members of that are not part of a shared photo album, but the majority of the participants are part of the shared photo album, in some cases the check at block 720 may find a match with the shared photo album containing a majority of the participants in the messaging. Again, the partial matching may be disabled in a user setting or may provide a prompt to a user to confirm that the user wants to enter the event in the shared photo album whose membership is only a partial match to the messaging correspondents. In this case, the members of the messaging not part of the shared photo album may be invited to the album, either automatically or by sending messaging to an administrator of the shared photo album.

In some embodiments, other users of the messaging thread are prompted and must agree before the automatic sharing starts for photos of that they send.

Therefore, based on the check at block 720 and the selection of the shared photo album at block 740, the selection or prompt to a user of a shared photo album can more appropriately align with messaging correspondents.

Messaging the Members of a Shared Photo Album

Figure 8:
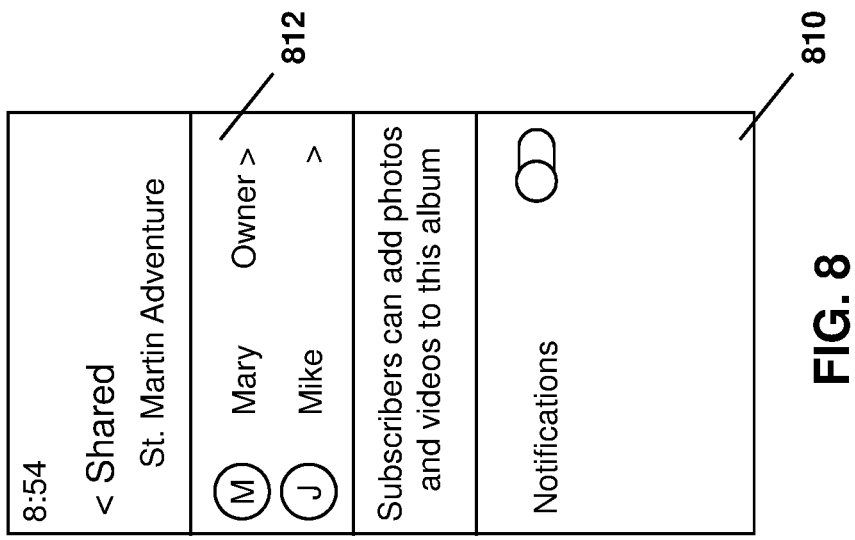
FIG. 8 is a block diagram showing an example window in which a shared photo album is provided with a name and other configurable parameters.

In a further embodiment, from within the messaging application, messages may be sent to members of a shared photo album corresponding to a shared photo album application by reference to the name or other identifier of the shared photo album. For example, in FIG. 8, details of a shared photo album 810 are provided. In particular, shared photo album 810 is called "St. Martin's Adventures" and includes two users, namely Mike and Mary, where Mary is identified as the owner of the shared photo album, as shown in area 812. Additional members of the shared photo album are possible.

Figure 9:
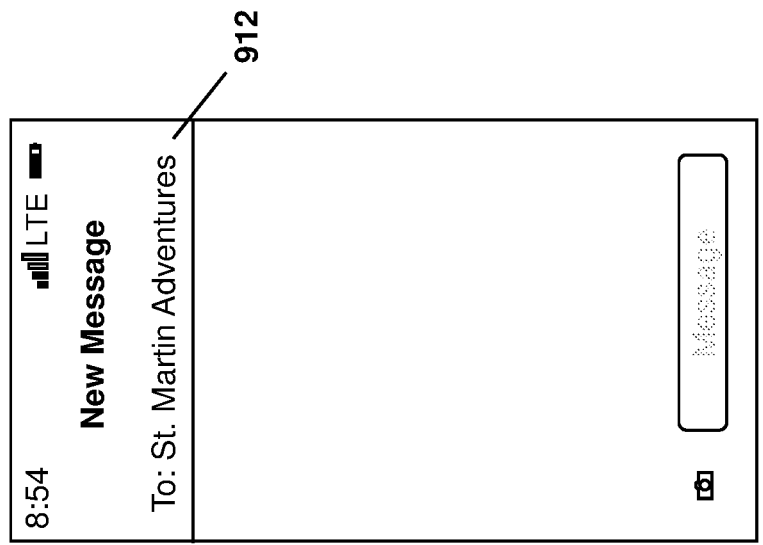
FIG. 9 is a block diagram showing a message application creating a new thread with the recipient being in the shared photo album.

By naming the shared photo album, the album may be used in a messaging application. Reference is now made to FIG. 9. In the embodiment of FIG. 9, a user may start a new messaging thread and fill the "to:" field 912 with the name of the shared photo album.

The messaging application will then send messages to all members of the shared photo album, similar to an existing operation for group messaging. The use of the name of the shared photo album will, in some cases, default to automatically save all photographs and videos exchanged within the messaging thread "St. Martin's Adventures" to the shared photo album "St. Martin's Adventures" and a corresponding alert (similar to alert 132) may be provided within the messaging thread.

Figure 10:
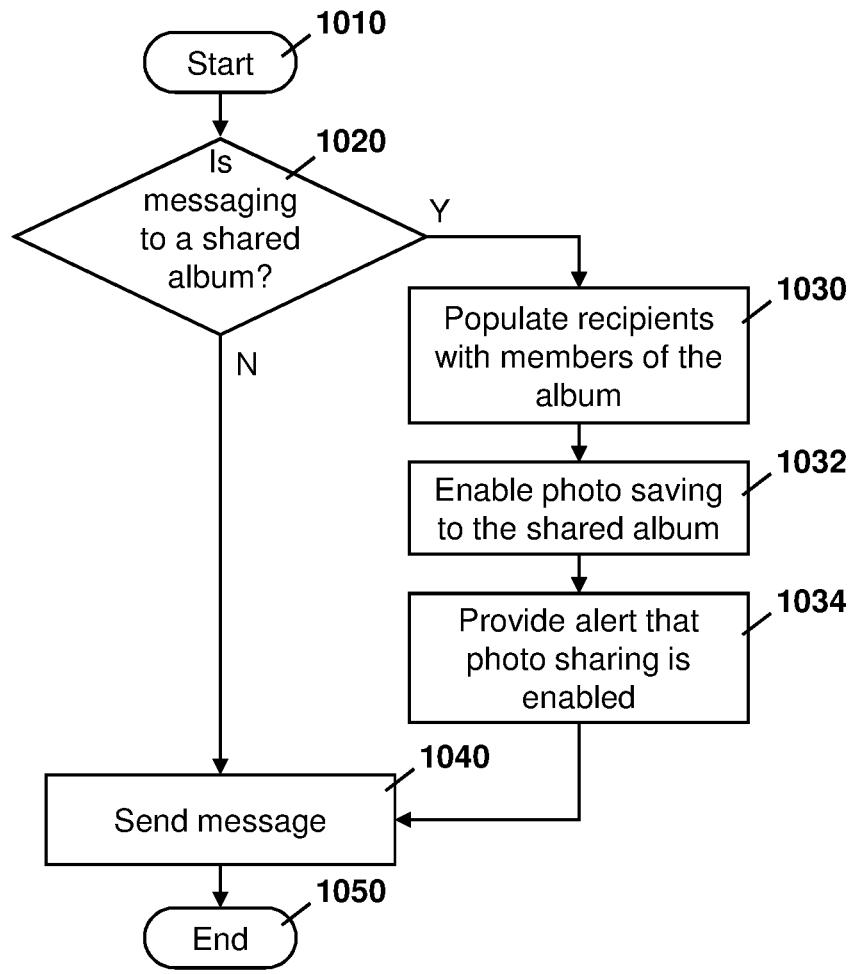
FIG. 10 is a process diagram showing a process for the creation of the new message thread based on the recipient being a shared photo album.

A process for the messaging of the members of a shared photo album is for example shown with regard to FIG. 10. In particular, the process of FIG. 10 starts at block 1010 and proceeds to block 1020. At block 1020, a check is made to determine whether the messaging is addressed to a shared album. For example, from FIG. 9 above, if the "to:" field is populated with the name of the shared album, then the determination at block 1020 may find that the messaging is to the shared album.

Upon determination that the messaging is to the shared album, the process proceeds to block 1030 in which the message recipients are populated with the members of the shared album (other than the sender of the message). Alternatively, the messaging application populates the messaging application recipient field with the name or other identifier of the shared photo album (and in some cases only the name or other identifier of the shared photo album) and the messaging application treats the message as if it was addressed to the members of the shared album (other than the sender of the message).

The process then proceeds to block 1032 in which photo sharing is enabled to the shared album for messaging that occurs in the message thread.

The process then proceeds to block 1034 in which an alert is provided on a user interface indicating that sharing is enabled. For example, such alert may be the alert shown in field 132 of FIG. 3.

From block 1034, or from block 1020 if the messaging is not to a shared album, the process may proceed to block 1040 in which any generated message can be sent to the designated recipients. The sending may involve the process of FIG. 5 in which photo detection may occur in order to save any photographs in the messaging thread into the shared album if the recipient is the shared album.

From block 1040, the process proceeds to block 1050 and ends.

Therefore, based on the above, a messaging application on an electronic device may accommodate saving of photographs to shared photo albums by automatically extracting photos in a messaging thread. The shared photo album may be selected based on the members of the messaging thread. The photo sharing may further be limited by time or size of photographs.

In some cases, messaging may be made to the shared photo album, which would then populate the recipients of the messaging with the members of the shared photo album. Further, this may automatically enable the photo sharing functionality.

The modules and user equipments and devices performing the methods described above may be any electronic device or network node. Such electronic device or network node may include any type of computing device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 11:
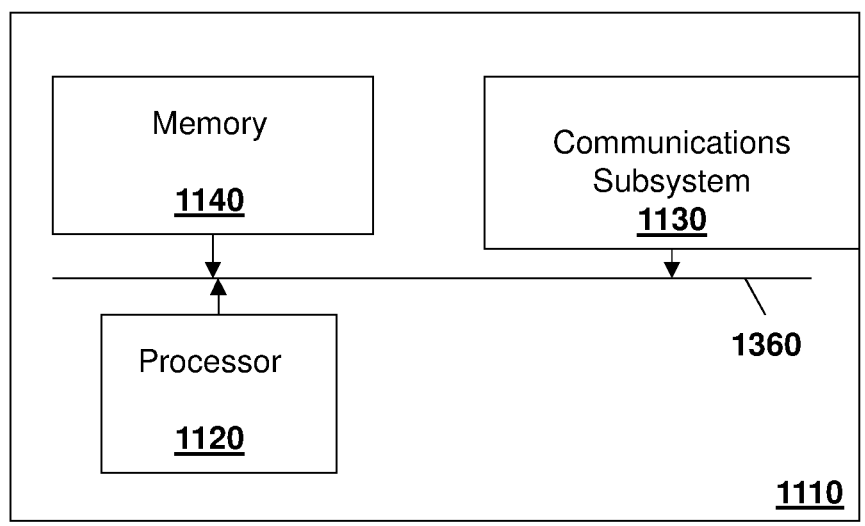
FIG. 11 is a block diagram of a simplified electronic device capable of being used with the methods and systems herein according to one embodiment.

One simplified diagram of an electronic device is shown with regard to FIG. 11.

In FIG. 11, device 1110 includes a processor 1120 and a communications subsystem 1130, where the processor 1120 and communications subsystem 1130 cooperate to perform the methods of the embodiments described above. Communications subsystem 1120 may, in some embodiments, comprise multiple subsystems, for example for different radio technologies.

Processor 1120 is configured to execute programmable logic, which may be stored, along with data, on device 1110, and shown in the example of FIG. 11 as memory 1140. Memory 1140 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1140, device 1110 may access data or programmable logic from an external storage medium, for example through communications subsystem 1130.

Communications subsystem 1130 allows device 1110 to communicate with other devices or network elements and may vary based on the type of communication being performed. Further, communications subsystem 1130 may comprise a plurality of communications technologies, including any wired or wireless communications technology.

Communications between the various elements of device 1110 may be through an internal bus 1160 in one embodiment. However, other forms of communication are possible.

Further, if the electronic device is a user equipment, one example user equipment is described below with regard to FIG. 12.

User equipment 1200 may comprise a two-way wireless communication device having voice or data communication capabilities or both. User equipment 1200 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 1200 is enabled for two-way communication, it may incorporate a communication subsystem 1211, including a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the user equipment is intended to operate.

Network access requirements will also vary depending upon the type of network 1219. In some networks, network access is associated with a subscriber or user of the user equipment 1200. A user equipment may require an embedded or a removable user identity module (RUIM) or a subscriber identity module (SIM) card or a UMTS SIM (USIM) in order to operate on a network. The USIM/SIM/RUIM interface 1244 is normally similar to a card-slot into which a USIM/SIM/RUIM card can be inserted and ejected. The USIM/SIM/RUIM card can have memory and hold many key configurations 1251, and other information 1253 such as identification, and subscriber related information.

When required network registration or activation procedures have been completed, user equipment 1200 may send and receive communication signals over the network 1219. As illustrated in FIG. 12, network 1219 can include multiple base stations communicating with the mobile device.

Signals received by antenna 1216 through communication network 1219 are input to receiver 1212, which may perform such common receiver functions as signal amplification, frequency down conversion, filtering, channel selection and the like. Analog to digital (A/D) conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog (D/A) conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

User equipment 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem or DSRC subsystem, and any other device subsystems generally designated as 1242. Serial port 1230 could include a USB port, On-Board Diagnostics (OBD) port or other port known to those in the art.

Figure 12:
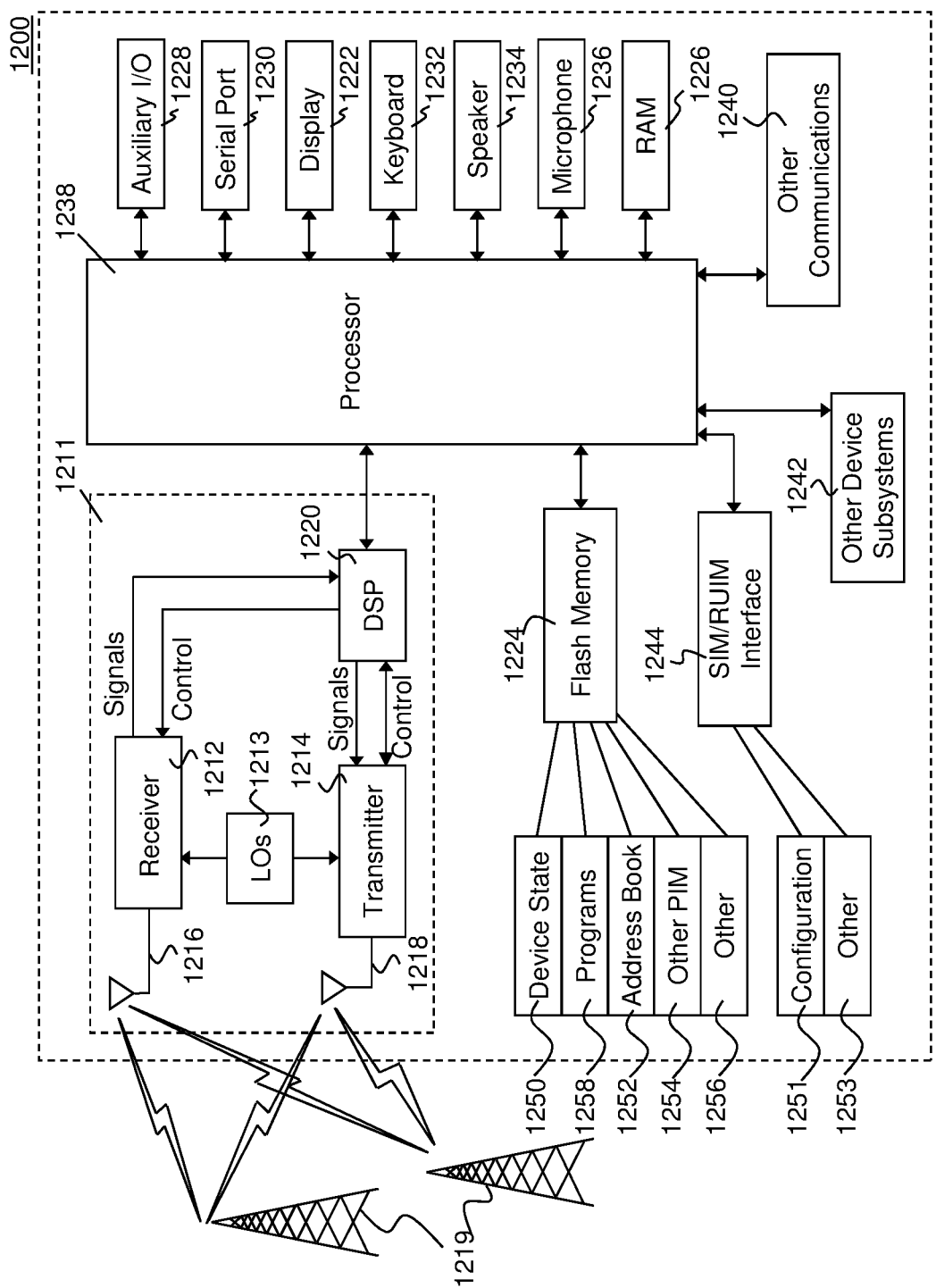
FIG. 12 is a block diagram of a mobile device according to one embodiment.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the user equipment. A predetermined set of applications that control basic operations, including potentially data and voice communication applications for example, will normally be installed on user equipment 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, photo albums, voice mails, appointments, and task items. Further applications, including productivity applications, messaging applications, social media applications, games, among others, may also be loaded onto the user equipment 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of user equipment 1200 may also compose data items such as messages for example, using the keyboard 1232, which may be a complete alphanumeric keyboard or telephone-type keypad, either physical or virtual, among others, in conjunction with the display 1222 and possibly an auxiliary I/O device 1228. Such composed items may then be transmitted over a communication network through the communication subsystem 1211.

Where voice communications are provided, overall operation of user equipment 1200 is similar, except that received signals may typically be output to a speaker 1234 and signals for transmission may be generated by a microphone 1236. Alternative voice or audio I/O subsystems, such as a voice message recording subsystem, may also be implemented on user equipment 1200. Although voice or audio signal output is preferably accomplished primarily through the speaker 1234, display 1222 may also be used to provide an indication of the identity of a calling party, the duration of a voice call, or other voice call related information for example.

Serial port 1230 in FIG. 12 may be implemented in a user equipment for which synchronization with a user's desktop computer (not shown) may be desirable, but is an optional device component. Such a port 1230 may enable a user to set preferences through an external device or software application and may extend the capabilities of user equipment 1200 by providing for information or software downloads to user equipment 1200 other than through a wireless communication network. As will be appreciated by those skilled in the art, serial port 1230 can further be used to connect the user equipment to a computer to act as a modem or for charging a battery on the user equipment.

Other communications subsystems 1240, such as a short-range communications subsystem, is a further component which may provide for communication between user equipment 1200 and different systems or devices, which need not necessarily be similar devices. For example, the subsystem 1240 may include an infrared device and associated circuits and components or a Bluetooth™ or Bluetooth™ Low Energy communication module to provide for communication with similarly enabled systems and devices. Subsystem 1240 may further include non-cellular communications such as Wi-Fi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an electronic device, the method comprising:
receiving a user interface input within a messaging application on the electronic device, the user interface input signaling that at least one of photographs or videos exchanged within a message thread on the messaging application should be stored within a shared photo album, wherein the messaging application is a distinct application from a shared photo album application, wherein only a subset of a plurality of messaging threads for the messaging application have corresponding shared photo albums;
selecting a shared photo album from a plurality of shared photo albums, the selecting comprising:
comparing correspondents of the message thread with membership of the shared photo album;
when the membership of the shared photo album is equivalent to the correspondents of the message thread, selecting the shared photo album; and
configuring the selected shared photo album as a configured shared photo album.

2. The method of claim 1, wherein the selecting is based on an exact match between correspondents of the message thread and membership in the shared photo album.

3. The method of claim 1, wherein the selecting is based on the correspondents of the message thread being a subset of membership in the shared photo album.

4. The method of claim 1, wherein the configuring comprises:
populating a user selection field with an indication of the selected at least one shared photo album; and
receiving a user interface selection at the electronic device of an indication of one of the selected at least one shared photo album.

5. The method of claim 1, further comprising:
transmitting or receiving a second message within the message thread on the electronic device;
processing the second message to find photographs or videos; and
saving found photographs or videos to the configured shared photo album.

6. The method of claim 5, further comprising saving supplementary data associated with the found photographs or videos to the shared photo album.

7. The method of claim 1, further comprising:
receiving at a user interface of the electronic device a selection of a photograph in the messaging application; and
providing an option on the user interface to delete the photograph from the configured shared photo album.

8. The method of claim 1, further comprising providing an alert within the messaging application, the alert indicating that photographs or videos are automatically being saved to the configured shared photo album.

9. The method of claim 1, further comprising receiving an input on a user interface of the electronic device to limit a time duration for the saving of photographs or videos to the configured shared photo album.

10. A method at an electronic device, the method comprising:
maintaining, in a memory of the electronic device, a list of names for each of a plurality of shared photo albums;
receiving, in a new message thread in a messaging application, a name for a shared photo album of the plurality of shared photo albums as a recipient for the new message thread, the shared photo album having at least two members, where the name for the shared photo album is selected from the plurality of shared photo albums by:
comparing correspondents of the message thread with membership of the shared photo album; and
when the membership of the shared photo album is equivalent to the correspondents of the message thread, selecting the shared photo album, wherein the messaging application is a distinct application from a shared photo album application and wherein only a subset of a plurality of messaging threads for the messaging application have corresponding shared photo albums;
receiving input of a first message for transmission within the message thread;
transmitting the first message to at least one other member of the shared photo album;
receiving input of a first image for transmission within the message thread; and
enabling automatic saving of the image to the named shared photo album upon transmission.

11. The method of claim 10, wherein the name of the shared photo album corresponds to the name of the shared photo album in an application distinct from the messaging application.

12. A non-transitory computer readable medium for storing instruction code which, when executed on a processor of an electronic device cause the electronic device to:
receive a user interface input within a messaging application on the electronic device, the user interface input signaling that at least one of photographs or videos exchanged within a message thread on the messaging application should be stored within a shared photo album wherein the messaging application is a distinct application from a shared photo album application, wherein only a subset of a plurality of messaging threads for the messaging application have corresponding shared photo albums;
select a shared photo album from a plurality of shared photo albums, the selecting comprising:
comparing correspondents of the message thread with membership of the shared photo album;
when the membership of the shared photo album is equivalent to the correspondents of the message thread, selecting the shared photo album; and
configure the selected shared photo album as a configured shared photo album.

13. The non-transitory computer readable medium of claim 12, wherein the electronic device is caused to select based on an exact match between correspondents of the message thread and membership in the shared photo album.

14. The non-transitory computer readable medium of claim 12, wherein the electronic device is caused to select based on the correspondents of the message thread being a subset of membership in the shared photo album.

15. The non-transitory computer readable medium of claim 12, wherein the electronic device is further caused to:

populate a user selection field with an indication of the selected at least one shared photo album; and receive a user interface selection at the electronic device of an indication of one of the selected at least one shared photo album.

16. The non-transitory computer readable medium of claim 12, wherein the electronic device is further caused to:

transmit or receive a second message within the message thread on the electronic device;

process the second message to find photographs or videos; and save found photographs or videos to the configured shared photo album.

17. The non-transitory computer readable medium of claim 16, wherein the electronic device is further caused to save supplementary data associated with the found photographs or videos to the shared photo album.

18. The non-transitory computer readable medium of claim 12, wherein the electronic device is further caused to:

receive at a user interface of the electronic device a selection of a photograph in the messaging application; and provide an option on the user interface to delete the photograph from the configured shared photo album.

19. The non-transitory computer readable medium of claim 12, wherein the electronic device is further caused to provide an alert within the messaging application, the alert indicating that photographs or videos are automatically being saved to the configured shared photo album.

20. The non-transitory computer readable medium of claim 12, wherein the electronic device is further caused to receive an input on a user interface of the electronic device to limit a time duration for the saving of photographs or videos to the configured shared photo album.

* * * * *